US006477585B1

(12) United States Patent
Cohen et al.

(10) Patent No.: US 6,477,585 B1
(45) Date of Patent: *Nov. 5, 2002

(54) FILTER MECHANISM FOR AN EVENT MANAGEMENT SERVICE

(75) Inventors: Richard Jay Cohen; Gregory Alan Wilson, both of Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1317 days.

(21) Appl. No.: 08/516,854

(22) Filed: Aug. 18, 1995

(51) Int. Cl.$^7$ ................................................. G06F 9/44
(52) U.S. Cl. ....................................................... 709/318
(58) Field of Search ................................ 395/680, 682, 395/683, 684, 200.01, 200.02, 200.03, 200.04, 200.05, 200.06, 200.11; 709/318

(56) References Cited

U.S. PATENT DOCUMENTS

| 4,068,298 A | | 1/1978 | Dechant et al. ............. 395/603 |
| 5,165,018 A | | 11/1992 | Simor ...................... 395/200.1 |
| 5,295,244 A | * | 3/1994 | Dev et al. ................... 395/357 |
| 5,434,845 A | * | 7/1995 | Miller ......................... 370/252 |
| 5,488,648 A | * | 1/1996 | Womble ...................... 379/13 |
| 5,495,470 A | * | 2/1996 | Tyburski et al. ............. 370/248 |
| 5,504,921 A | * | 4/1996 | Dev et al. ................... 395/800 |

FOREIGN PATENT DOCUMENTS

| EP | 0537098 A2 | 4/1993 |
| JP | 1-291333 | 11/1989 |
| JP | 2-288918 | 11/1990 |
| JP | 5-507575 | 10/1993 |
| JP | 6-180654 | 6/1994 |

OTHER PUBLICATIONS

Tomlinson, Paula, "Using Windows NT Event Logging", Windows Developer's Journal, pp(16), Jul. 1994.*
AS "HI–UX/WE2 Total Network Managed System–NETM*Comet, Programmers Guide, 3000–3–530" pp. 70–110, Dec. 1994, First Edition, Hitachi Ltd.
At IBM Technical Disclosure Bulletin vol. 37 No. 12, Dec. 1994, LAN Netview FIX Remote Event Enablement/Disablement.
AU OS/2 2.1 Application Programmer's Guide, Jody Kelly, Craig Sweringen, Dawn Bezviner, Theodore Shrader. Van Hostrand Reinhold, New York.
IBM Technical Disclosure Bulletin vol. 37 No. 12 Dec. 1994, LAN Netview FIX Remote Event Enablement/Disablement.
OS/2 2.1 Application Programmer's Guide—Jody Kelly, Craig Searingen, Dawn Bezviner, Theodore Shrader—Van Nostrand Reinhold, New York.

* cited by examiner

*Primary Examiner*—St. John Courtenay, III
(74) *Attorney, Agent, or Firm*—Jeffrey S. LaBaw; David H. Judson; Joseph R. Burwell

(57) ABSTRACT

An event management service (EMS) of a distributed computing environment includes a filter mechanism for determining whether events generated by one or more event suppliers are communicated to one or more event consumers. Each event consumer that registers for the service also defines an event filter group that determines whether particular events generated by the one or more event suppliers are communicated to that event consumer. The event filter group is derived from one or more predefined event type schemas and/or event header information. Events supplied to the service are applied through a parser of the filter mechanism to control whether and where a particular event is routed.

14 Claims, 5 Drawing Sheets

FILTER MECHANISM FOR AN EVENT MANAGEMENT SERVICE

TECHNICAL FIELD

The present invention relates generally to computing networks and more particularly to methods for managing events in a distributed computing environment domain.

BACKGROUND OF THE INVENTION

It is well known to interconnect multiple computers into a local area network (LAN) to enable such computers to exchange information and share resources. A local area network provides a distributed computing environment in which users can access distributed resources and process applications on multiple computers. An "event" marks a change in state of some managed resource in the environment.

A known distributed computing environment, called DCE, has been implemented using software available from the Open Systems Foundation (OSF). Prior OSF DCE computer network implementations provide event services on a local level only. Thus, events generated on a particular machine in the network are only logged or displayed on the machine itself. Other machines in the network have no efficient means for receiving notification when events occur in remote resources in the network. This deficiency makes it difficult for a system manager to remotely manage other resources in the network.

There are event service architectures known in the prior art. One known architecture is the DME Event Service (EVS), which is described in "DME Event Services Architecture, Version 2.0" by Ferrante, dated Apr. 28, 1993. This service uses the concept of event suppliers (who produce event data) and event consumers (who process event data generated by the suppliers), but the service has a cumbersome subscription mechanism, is complex and cannot be integrated into other existing DCE services. Another known architecture is the OMG Event Service model, which is described in the "Joint Object Services Submission—Event Service Specification,"OMG TC 93.7.3, dated Jul. 2, 1993. This architecture provides an object-based event service that defines two basic models for communicating event data: the push model, which allows event suppliers to initiate the transfer of events to consumers, and the pull model, which allows event consumers to request events from event suppliers. Theoretically, an event channel object allows multiple suppliers to communicate with multiple consumers in an asynchronous way. The main drawback to the OMG Event Service model is that there are no currently-available implementations.

There remains a need to provide event management services for both traditional and object-oriented system architectures wherein managed resources can send asynchronous notifications or "events" to interested parties.

BRIEF SUMMARY OF THE INVENTION

It is thus a primary object of the present invention to allow multiple event suppliers to communicate with multiple event consumers in an asynchronous fashion in a distributed computing environment.

It is a another more specific object of the invention to tightly integrate an event management service into an existing distributed computing environment event service to transparently supply events in an asynchronous manner to authorized, remote event consumers.

It is a further object of this invention to communicate events between event supplier and event consumer by issuing remote DCE procedure calls (RPC's).

It is still another object of the present invention to provide a DCE RPC-based asynchronous event management service wherein event suppliers and consumers are authenticated prior to using the service by a DCE security service.

It is yet a further more specific object of the invention to integrate an event management service into a DCE network implementation using event forwarding, security and remote procedure call services in the DCE network.

It is still another object of the invention to filter events generated by one or more event suppliers to determine whether particular events are communicated to one or more event consumers.

According to another more specific object of the invention, event consumers can locate and register with one or more event management services running on multiple host computers in the network. Event consumers can control which host computers send events and the particular types of events sent.

It is still another object of the invention to manage events wherein event suppliers are not aware of the event consumers that have registered to receive events. Preferably, a particular supplier need only send an event once to ensure that interested event consumers receive notification of that event.

It is a more general object of the Invention to reliably deliver events to consumers with minimal network and system load, and in a manner that is tolerant of network and machine failures.

In one illustrative embodiment, a method of managing events in a distributed computing environment is provided wherein one or more event suppliers generate events to be consumed by one or more event consumers. The method begins by having an event consumer register with an event management service (EMS) to receive selected events generated from the one or more event suppliers. In response to a remote procedure call (RPC) from a DCE event recording service, the event management service uses a filtering mechanism to determine whether the event associated with the RPC has been selected by the event consumer, If the EMS determines that the event data associated with the RPC has been selected by the event consumer, it issues a remote procedure call to supply the event data to the event consumer. When multiple event consumers register with the event management service, events occurring on remote machines in the network are asynchronously and transparently supplied to event consumers.

In the preferred embodiment, the event management service is tightly coupled to a DCE event recording service, although this integration is not necessarily required as the event management service may be accessed directly. Also, it is preferred (although not required) that suppliers and consumers be authenticated in connection with registering with the event management service, and such authentication may advantageously be carried out by a DCE security service. Thus, preferably the event management service takes advantage of existing event recording, security and remote procedure call services in the DCE network to provide efficient asynchronous event management.

According to another more specific feature of the invention, a novel filter mechanism is provided to control how event data generated by the event suppliers is passed to particular event consumers. According to this aspect of the invention, each event consumer that registers with the service defines an event filter group that determines whether particular events generated by the one or more event suppliers are communicated to that event consumer. An event filter group includes one or more event filters, each of which is derived from one or more predefined event type schemas and/or information in a header associated with each event. The filter mechanism parses events through the event filter groups of the event consumers. Events that satisfy the parsing protocol for a particular event consumer are communicated to that consumer via a remote procedure call.

In the event service, often multiple event consumers are interested in the same event data, yet event consumers may not be able to consume events as fast as they are transmitted from the service. In addition, it is desired that when sending an event, suppliers should not be blocked while trying to forward the event to EMS, and the event service should not be blocked while attempting to forward the event to interested consumers. To achieve these goals, the Event Management Service implements a novel queuing mechanism that utilizes a number of threads-based services including a process control routine to insure that neither event suppliers nor event consumers take any actions that block the event channel.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
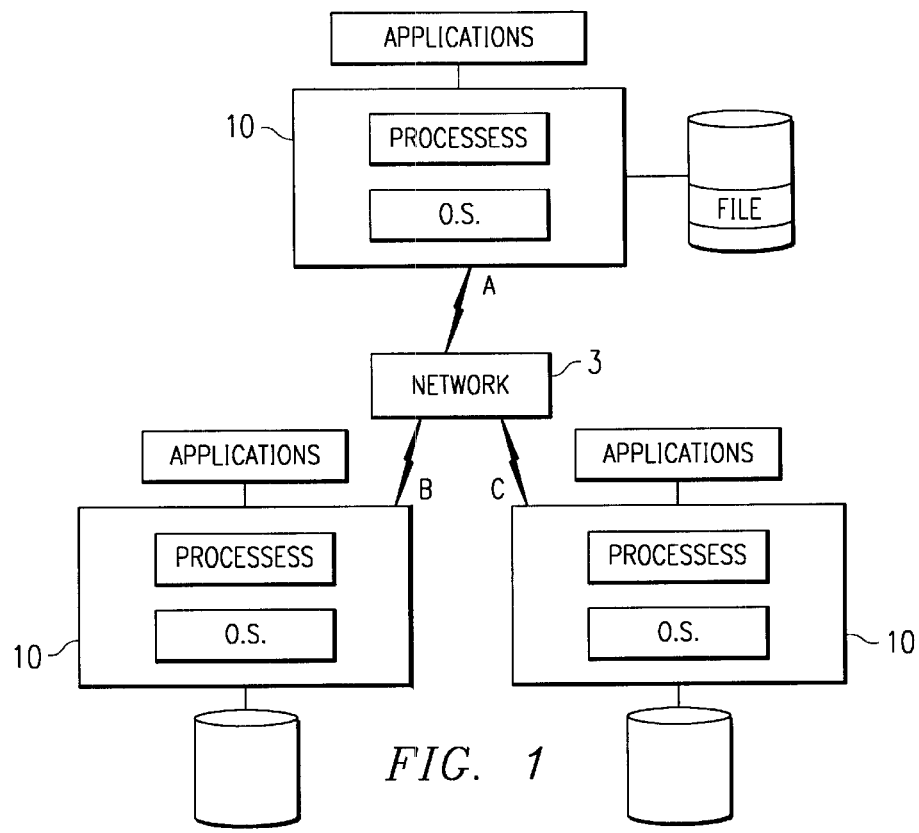
FIG. 1 illustrates a computer network in which the present invention is implemented.

A known distributed computing environment (DCE) is illustrated in FIG. 1 and includes two or more nodes A, B and C connected through a communication link or network 3. The network 3 can be a local area network (LAN) or a wide area network (WAN), the latter comprising a switched or leased teleprocessing (TP) connection to other nodes or to a network of systems operating under a known computer architecture. At any of the nodes A, B or C there may be a processing system 10A, 10B or 10C. Each of these systems may be a single user system or a multi-user system. Each of the processing systems may operate as a client or server, depending on whether it is requesting or supplying services.

Each of the processing systems is a computer, referred to herein sometimes as a "machine." For example, each computer may be a RISC System/6000® (a reduced instruction set or so-called RISC-based workstation) running the AIX® (Advanced Interactive Executive) operating system. The AIX® operating system is compatible at the application interface level with AT&T's UNIX operating system, version 5.2. The various models of the RISC-based personal computers are described in many publications of the IBM Corporation, for example, *RISC System/6000, 7073 and 7016 POWERstation and POWERserver Hardware Technical Reference*, Order No. SA23-2644-00. The AIX operating system is described in *AIX Operating System Technical Reference*, published by IBM Corporation, First Edition (November, 1985), and other publications. A detailed description of the design of the UNIX operating system is found in a book by Maurice J. Bach, *Design of the Unix Operating System*, published by Prentice-Hall (1986). Alternatively, each computer may be an IBM® PS/2® running under the OS/2® operating system. For more information on the PS/2 line of computers and the OS/2 operating system, the reader is directed to *Technical Reference Manual Personal Systems/2 Model 50, 60 Systems IBM Corporation*, Part No. 68x2224 Order Number S68X-2224 and *OS/2 2.0 Technical Library, Programming Guide Volumes 1–3 Version 2.00*, Order Nos. 10G6261, 10G6495 and 10G6494.

In one particular implementation, the invention runs on a plurality of IBM RISC System/6000 machines interconnected by IBM's Transmission Control Protocol/Internet Protocol (TCP/IP) architecture. TCP/IP uses as its link level Ethernet, a local area network (LAN) developed by Xerox Corporation. A simplified description of local area networks may be found in a book by Larry E. Jordan and Bruce Churchill entitled *Communications and Networking for the IBM PC*, published by Robert J. Brady (a Prentice-Hall Company)(1983). Although the invention is described in the above identified context, it should be appreciated that the teachings herein may be implemented using other and different computers interconnected by other networks than the Ethernet LAN or IBM's TCP/IP.

Figure 2:
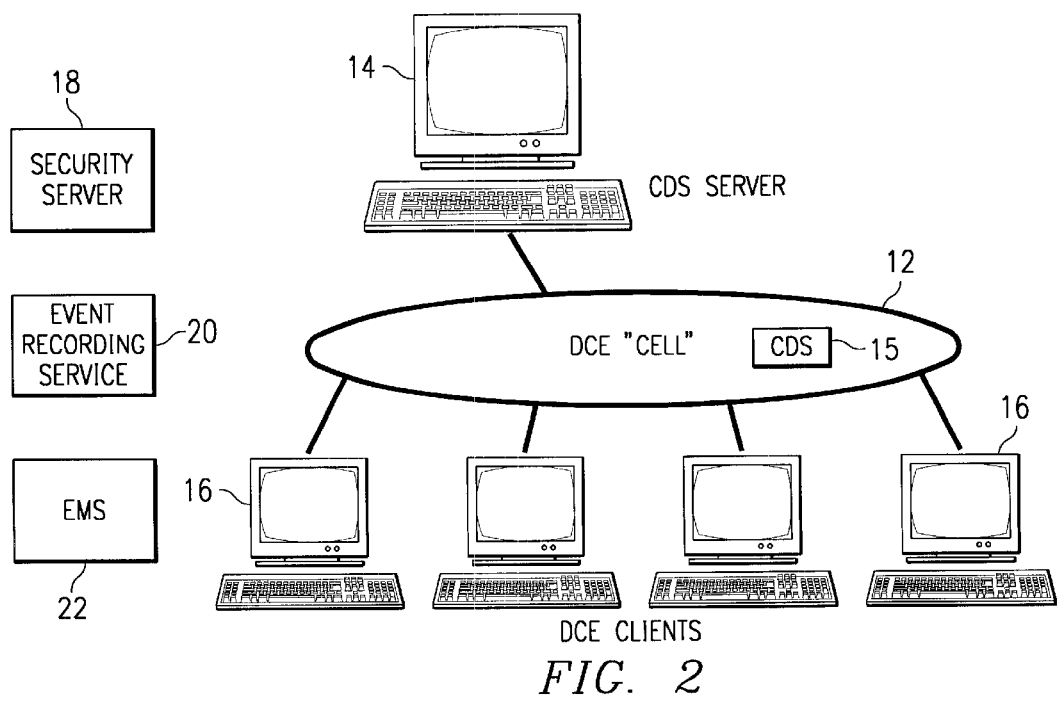
FIG. 2 illustrates a representative distributed computing domain of connected machines in which the invention is implemented.

Preferably, the invention is implemented in a distributed computing environment having any number of machines, and these machines may be located in different geographic locations. For illustrative purposes, the remainder of the detailed discussion is directed to a DCE domain or "cell," which is a relatively smaller version of the network (with up to about 25 machines), although the teachings of the invention are applicable to any distributed computing environment (whether traditional (SNMP and CMIP) or object-oriented). FIG. 2 shows a representative DCE cell 12 in which the present invention is implemented. The cell 12 comprises a set of connected machines, including at least one server 14 and the DCE clients 116, which share a common cell name and a namespace. Each cell provides a location independent namespace service called CDS, or Cell Directory Service 15. The naming service is used by application servers to store their location and interfaces, known as server bindings. The cell typically includes one or more other server machines that provide other services of the distributed computing environment. These other services include, without limitation, a Security Service 18, which faciliates authentication, and an Event Recording Service 20, which is a DCE service that application developers may use to record application events.

In a known DCE implementation, events are of several types. "Service" events typically include such things as error messages, warnings, abort messages and generic resource information. Another type of event is an "audit" event, Known DCE implementations include a Serviceability (SVC) interface and an Audit interface within the Event Recording Service 20 for processing these events. The SVC and Audit interfaces allow recording of events.

According to one feature of the present invention as will be described, calls to the Serviceability and Audit interfaces within the Event Recording Service 20 are automatically provided via remote procedure calls (RPC's) to an Event Management Service (EMS) 22, which is also a server called "emsd," to facilitate asynchronous event management of events by and among so-called "event suppliers" and "event consumers." The EMS 22 may also be reached by being called directly. For convenience, the passage of events through the SVC or Audit interfaces is sometimes referred to as a first level or "supplier-side" event filtering. Generally, an event supplier is a DCE-based application (including DCE core servers) which emits events. An "event" refers to the change of state of some managed resource and is embodied in the data transmitted between an event supplier and EMS, and between EMS and one or more event consumers. Such event data consists of an event header, and a list of event attributes which contain event type specific data. In one implementation, all DCE applications that use the SVC or Audit interfaces of the Event Recording Service 20 are event suppliers An "event consumer" is any DCE server application which registers with the EMS 22 (as will be described) to receive and process events from one or more "event suppliers."

Figure 3:
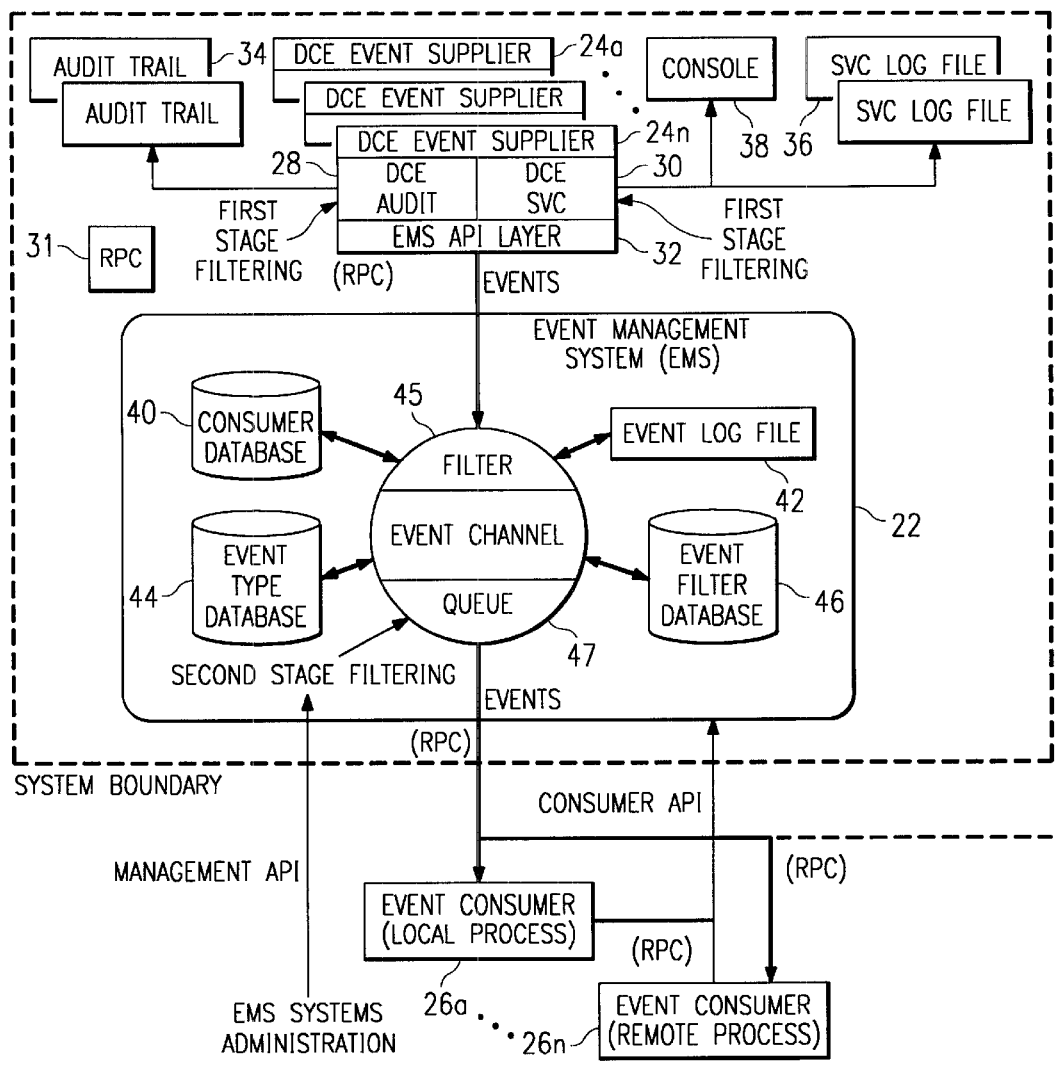
FIG. 3 is a diagram showing a representative implementation of the event management service of the invention within the context of a pre-existing DCE subsystem.

Turning now to FIG. 3, a diagram is shown illustrating one preferred implementation of the event management service of the present invention within an existing DOE system. The DCE subsystems and functionality are illustrated and include the DCE SVC and Audit interfaces 28 and 30, and remote procedure call (RPC) mechanisms 31. An EMS Application Programming Interface (API) 32 may be used by event supplier(s) to reach the Event Management Service 22. EMS 22 acts as an "event channel" to uncouple one or more event suppliers 24a–24n from the one or more event consumers 26a–26n. Communications through the event channel are "asynchronous" in that they may be provided to the event consumers at any time. Event consumers may be local or remote processes as shown. Communications between event suppliers and the EMS, on the one hand, and between the EMS and event consumers, on the other hand, are carried out using remote procedure call mechanisms of the DCE system. The portion of the drawing within the dotted line reflects (for representative purposes only) a single host computer of the distributed computing environment on which the EMS 22 and the plurality of DCE event suppliers 24 reside. The Event Recording Service 20 includes audit trails 34, SVC log files 36 and a console 38 where management functions are carried out.

As will be described in more detail below, the Event Management Service includes a number of databases and memory structures: a Consumer Database 40, an Event Log File 42, and Event Type Database 44, and an Event Filter Database 46. In order to start receiving events, it is preferred that an event consumer must first register with EMS 22. One representative technique for registering an event consumer includes providing the event consumer with a handle describing a connection to the event service and then having the consumer use that handle to issue an RPC to EMS. EMS then places an entry in the Consumer Database 40 that uniquely identifies the consumer. A "supplier" registers with the event management service by receiving a handle. The registration process thus defines a connection to a specific EMS process running on a specific machine. Although not required, registration may also involve having the event consumers and event suppliers authenticate themselves with the DCE Security Service (not shown).

Consumers that have registered with EMS are identified in the Consumer Database 40. The Event Log File 42 stores a collection of events to be sent to event consumers. The event log stores events in case EMS cannot forward events to all appropriate event consumers (e.g., because network connections are down). An event is deleted from the event log after that event is forwarded to all relevant consumers.

Before the event consumer can receive event data, however, it must also define a "filter" which EMS then uses to determine whether particular events from the one or more event suppliers gets passed to that event consumer. Initially, the event consumer uses general "event type" information in the Event Type Database 44 to create an particular "event filter group" for that consumer. As will be seen, the information in the Event Type Database 44 is also used by event suppliers and, possibly, an EMS administrator. The filter data selected or specified by an event consumer is then stored in the Event Filter Database 46.

Event Type Database 44 stores information used by EMS and event suppliers and consumers to generate "event types," each of which are a class of events that have the same event type format. An event type format is described via an "event type schema" and identified by a unique universal identifier (UUID). An event type schema is a description of an event type and consists of a list of attribute name/type pairs which specify the data format of an event An attribute name is a string that uniquely identifies an attribute of a given event type. An attribute type is the data type of an event attribute, which defines the format of the data in the attribute. Event type schema data (stored in database 44) and/or event header information is used by an event consumer to construct an "event filter group" to tell EMS which events to forward to that consumer.

Figure 4:
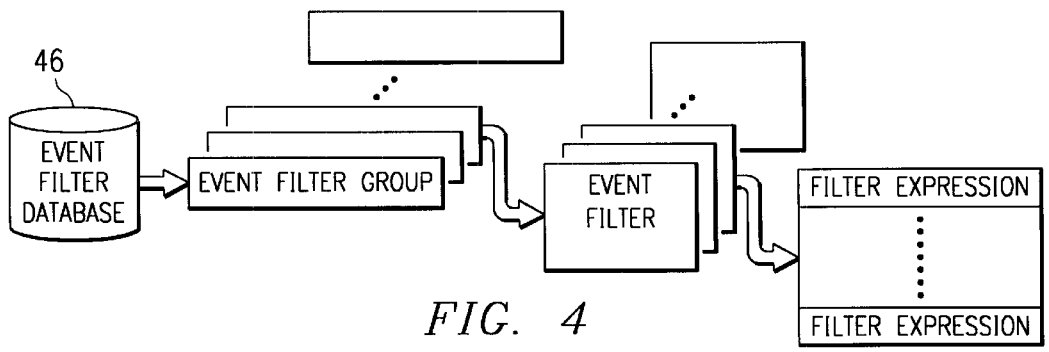
FIG. 4 is a diagram showing how event filters are formulated according to the present invention.

Referring to FIG. 4, an event filter group is a collection of one or more "event filters" which are logically ORed together. There is one event filter group per registered event consumer. An "event filter" is a collection of one or more "filter expressions" which are logically ANDed together, and each event filter has an event filter name and event type (which may be generic). As many event filter names as desired can be added to a consumer's event filter group to control what events EMS will send to that consumer The event filter names are listed in the Consumer Database. An event "filter expression" is preferably a 3-tuple consisting of the attribute name, the attribute value, and an attribute operator which defines a compare operation. The attribute operator in a filter expression is used to effect the comparison between the named attribute in the event and the attribute value. The attribute name in a filter expression may refer to an attribute name in an event type schema or header information. Thus, for example, if the header information includes time-stamp information, the event filter group may contain a filter having an event filter expression that refers to time-stamp information in the header.

Figure 5:
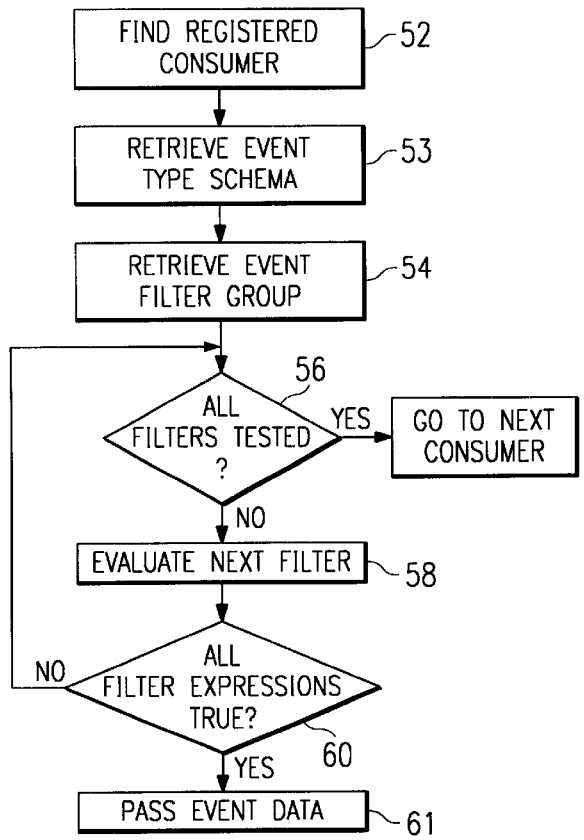
FIG. 5 is a flowchart illustrating an event consumer parser routine of the filter mechanism according to the invention.

Referring back to FIG. 3, to reach EMS an event passes through the Event Recording Service to EMS or EMS is called directly. Once the event arrives at EMS via a remote procedure call (RPC), it is stored in the Event Log 42. EMS 22 then performs a parsing operation to determine whether the event gets passed on to any event consumers. The information stored in the Event Filter Database 46 is a second stage or "consumer-side" EMS filter 45 that EMS 22 uses to make this evaluation. The second state filtering process is also illustrated in the flowchart of FIG. 5. After filtering, a queueing mechanism 47 is used (as discussed below) to control the flow of events to the interested consumers. After the event is forwarded to all interested consumers, it is deleted from the Event Log 42 (and the queues), The filtering routine begins each time an event reaches EMS. At step 52, EMS retrieves the event type schema for the particular event from the Event Type Database. At step 54, EMS 22 goes through the list of registered event consumers in the Consumer Database 40. For each registered consumer, the following processing occurs. At step 55, the registered consumer's event filter group is first retrieved from the Consumer Database. As described above, each event filter group refers to a collection of one or more filters, each of which include a list of one or more filter expressions. A parser protocol is then initiated. In particular, at step 56, the routine determines if all filters in the event filter group have been evaluated. If not, the routine continues at step 58 by evaluating a next filter in the event filter group. Within each filter, the routine looks at each filter expression. A test is then performed at step 60 to determine if all of the filter expressions within a particular filter are a predetermined condition, namely TRUE. If so, the routine passes the event to the RPC mechanism for delivery to the registered event consumer. If the outcome of the test at step 60 indicates that any one of the filter expressions in the filter are FALSE, then the routine returns to step 56 to obtain a next filter in the event filter group (as identified by a next event filter name). If the outcome of the test at step 56 indicates that all filters of the consumer's event filter group have been evaluated, the routine ceases and EMS goes on to the next consumer. Thus, according to the parser, unless all filter expressions in a particular filter of an event filter group are TRUE, the event is not forwarded by EMS to the event consumer.

Referring briefly back to FIG. 3, an event consumer may use the Consumer API to define a new event filter and add it to an event filter group. A consumer may also obtain a list of existing event filter names and add one of those event filter names to an event filter group. Event filter names (and thus filters) can be added or deleted from event filter groups by the consumer (through the Consumer API) as well as by an EMS administrator through a Management API as shown. Thus, the event consumer may modify the event filter group to add or delete new filters.

Event type schemas stored in the Event Type Database are preferably used in several different ways according to the invention. A consumer can request a list of supported event types and pick which event types it wants to receive by using the event type schemas to construct event filters. An event consumer also can map events according to attribute names. Event suppliers use event type schemes to define new event types they intend to produce. EMS uses event type schemas to apply event filters to events.

In many cases, multiple event consumers are interested in the same events, yet event consumers may not be able to consume events as fast as they are transmitted from the service. In addition, it is desired that when sending an event, suppliers should not be blocked while trying to forward the event to EMS, and the event service should not be blocked while attempting to forward the event to the interested consumers. To achieve these goals, the Event Management Service implements the queueing mechanism 47 which comprises queue defining data structures and a set of queue manipulation routines. These routines preferably use another existing DCE service, DCE Threads, to provide event queue management for the DCE Event Management Service. As is known in the art, threading allows multiple routines conceptually to run simultanteously and to share resources. The DCE Threads service is a set of routines that can be used to create a multi-threaded program. Multi-threading is used to improve the performance of a program by allowing pieces of the program operate concurrently. DCE Threads is a user-level (nonkernel) threads package based on the PTHREADS interface specified in "Draft 4 Of The POSIX 1003.4 Standard," which is hereby incorporated by reference.

Figure 6:
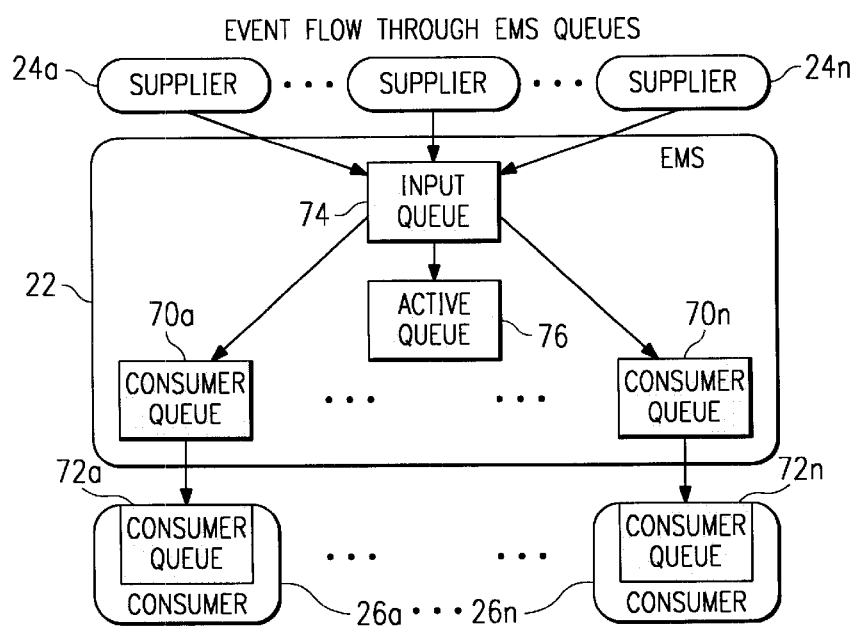
FIG. 6 is a diagram showing a queue configuration for the event management service.

This event queue mechanism is now generally described. According to the invention, and with reference to FIG. 6, whenever an event consumer registers with the EMS 22, a consumer queue 70a for that consumer is established within EMS. As seen in FIG. 6, the consumer process also has a corresponding event queue 72a. The event service maintains two queues, an input queue 74 and an active queue 76. According to the invention, each queue has a number of queue elements, and each queue element can have one of two types of data: a pointer to an event, or a pointer to another queue element. The active queue 76 of EMS has elements pointing to events that have not been sent to all interested consumers (i.e. those that have registered to receive the event in question), with each queue element corresponding to one event, Each queue element in the active queue also has a mutex protected count of how many relevant consumers have yet to receive the event. The consumer queues 70 of EMS have elements that contain pointers to elements in the active queue 76. Suitable routines of the queue mechanism are used to create and initialize a queue, to destroy a queue, to enqueue (e.g., "push") an element on a queue, to dequeue (e.g., "pop") an element off a queue, to delete an element from a queue, and to activates a queue (after restoring it).

Figure 7:
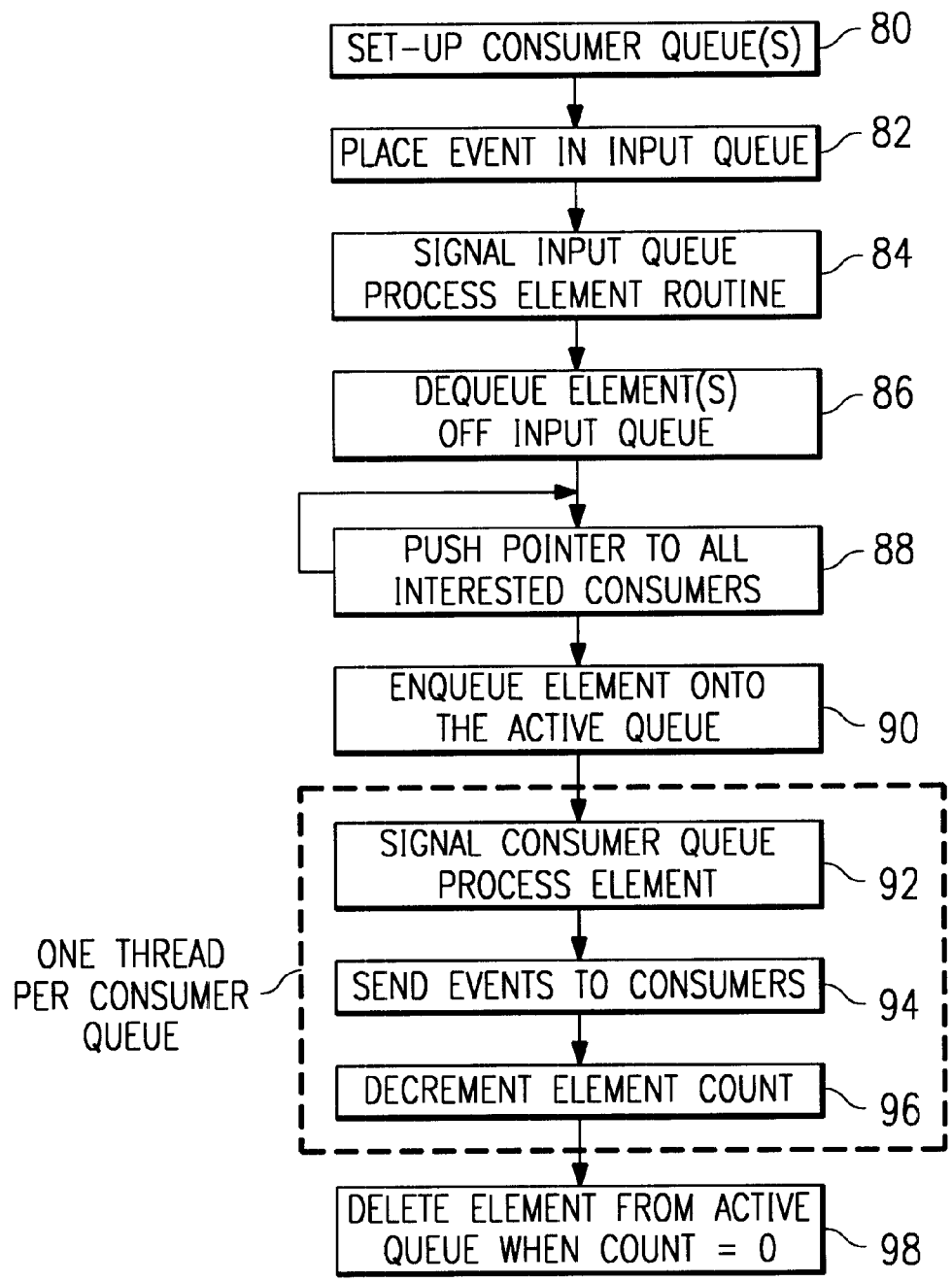
FIG. 7 is a flowchart illustrating an event queue management routine of the invention.

Referring now to FIG. 7, the queue management routine is now described in detail. The routine begins at step 80 by setting up a consumer queue 70 for each registered event consumer. When an event is sent to EMS 22, it is immediately placed on the input queue 74, and the RPC routine returns. This is step 82 in FIG. 7. A routine of the queue mechanism (called input queue process element), which is running in a separate DCE thread, is then signaled at step 84. This indicates that the input queue 74 is not empty. At step 86, each element is dequeued from the input queue 74. If any consumer is interested in the event that the element points to, then a pointer to that element is enqueued onto that consumer's queue 70 (in the EMS) at step 88 and a count associated with the element is incremented (to indicate that another event consumer is registered to receive the event) At step 90 (after the consumer queues 70 of the interested consumers have been updated to receive pointers), the queue element for the event is then pushed onto the active queue to wait for all the consumers to receive the event. At this time, the count represents the number of relevant event consumers (namely, those who want notice) who EMS must then notify of the event.

When an element is enqueued onto one of the consumer queues 70 (of the EMS), the thread running the consumer queue process element routine is signaled, as indicated at step 92, and that routine pops the element off the queue and sends it to the associated consumer queue at step 94. Once sent, the count associated with the queue element (in the active queue) is decremented at step 96. If the count reaches zero, all interested consumers have been notified and the queue element is deleted from the active queue as indicated at step 98.

Each of the steps 92, 94 and 96 are carried out in a distinct thread, and thus multiple instances of these steps occur simultaneously (at least conceptually) with respect to the consumer queues. When all threads have been successful in sending the particular event, the event is deleted from the active queue (and the Event Log 42).

As noted, each consumer process also has an event queue 72 as seen in FIG. 6. When an event is sent to the consumer, the event is put on this queue, and a signal is sent to the process element routine, which in turn pops elements off the consumer queue 72, and calls an event handler routine to retrieve the event.

DETAILED SPECIFICATION

A more detailed specification of the event management service as implemented in an OSF DCE is now provided. As noted above, the DCE EMS manages event services in a DCE cell. EMS preferably consists of two major parts, the emsd server and the API to access event services. The emd is a DCE server which may reside on every DCE host in the cell from which consumers will request events. It is also envisioned that emsd runs in a distributed fashion. Three interfaces are exported by emsd to support EMS suppliers, consumers and event services administration. The EMS API provides an interface to the same three interfaces for use by EMS clients The following sections describe in detail how EMS works along with a description of how to define event types, the event flow through EMS, how event filters work, how events get logged, and the security model used to protect both event data, and event filter definitions.

Event Flow Description

As noted above, EMS sets up an event channel to decouple the communications between the supplier and consumer. In order to start receiving events, preferably an event consumer first registers with EMS, then sets-up an event filter group to tell EMS which events to forward to that consumer. Before a supplier can send an event to EMS, the event typically passes through the first stage event filter. In this embodiment, first stage filtering is achieved at the supplier level by using SVC and Audit facilities. Once the event passes through the first stage filter, it is sent to EMS. EMS writes the event to the EMS Event Log in order to save the event in case the event cannot be immediately delivered.

Once the event reaches EMS, it passes through the second stage filter before being forwarded to interested consumers. Preferably, this is achieved by having EMS go through the list of registered consumers and uses the event type schema from the Event Type Database and the consumers event filter group from the consumer Database, and the event filters from the Event Filter Database to determine if this event passes through to be forwarded on for each event consumer. After all appropriate consumers receive the event, then the event is removed from the event log.

Event Type Definition

The format of EMS event types preferably are defined by event type schemas, and are kept in the EMS Event Type Database. The event type schemas typically consist of a list of attribute names along with the attribute type which specifies the data format of the data associated with that attribute. Each event is associated with a fixed header part and a variable length data part. The variable length data part preferably consists of N self-defining data items which consist of an attribute type, then the data itself. The data elements in the variable length part correspond in order, one for one with the list of attribute name/type pairs defined in the event type schema. The variable length part can have additional unnamed data items at the end of the named data items (i.e. the data items that have attribute names).

Generic Event Types

EMS supports events with type Generic. Generic events do not have an event type schema. The only way to define filters for generic events, is to use filter expressions with event header attributes.

Default Event Types

The following is the definition of the SVC and Audit event attribute lists which are contained in their event type schemas.:

```
#define CNT_SVC_ATTRS (sizeof(svc)/sizeof(ems_
   attribute_t))
static ems_attribute_t svc[ ]={
   {(unsigned char *)"version",
   {ems_c_attr_ulong_int,0}}.
   {(unsigned char *)"t", {ems_c_attr_utc,0} },
   {(unsigned char *)"argtypes",
   {ems_c_attr_char_string,0} },
   {(unsigned char *)"table_index",
   {ems_c_attr_ulong_int,0} },
   {(unsigned char *)"attributes",
   {ems_c_attr_ulong_int,0} },
   {(unsigned char *)"message_index",
   {ems_c_attr_ulong_int,0} },
   {(unsigned char *)"format",
   {ems_c_attr_char_string,0} },
   {(unsigned char *)"file",
   {ems_c_attr_char_string,0} },
   {(unsigned char *)"progname",
   {ems_o_attr_char_string,0} },
   {(unsigned char *)"line",
   {ems_c_attr_ulong_int,0} },
   {(unsigned char *)"threadid",
   {ems_c_attr_ulong_int,0} },
   {(unsigned char *)"component_name",
   {ems_c_attr_char_string,0} },
   {(unsigned char *)"sc_name",
   {ems_c_attr_char_string,0} },
   {(unsigned char *)"attribute.debug",
   {ems_c_attr_ushort_int,0} },
   {(unsigned char *)"attribute.severity",
   {ems_c_attr_ushort_int,0} },
   {(unsigned char *)"attribute.actroute",
   {ems_c_attr_ulong_int,0} }
};
```

Several constants have also been defined to use to match against the attribute.severity attribute. They are:

SVC_C_SEV_FATAL
SVC_C_SEV_ERROR
SVC_C_SEV_WARNING
SVC_C_SEV_NOTICE
SVC_C_SEV_NOTICE_VERBOSE

```
#define CNT_AUDIT_ATTRS (sizeof(audit)/sizeof
   (ems_attribute_t))
ems_attribute_t audit[ ]={
   {(unsigned char*)"format", {ems_c_attr_ushorn_
      int,0} },
```

```
{(unsigned char*)"server", {ems_c_attr_uuid,0} },
{(unsigned char*)"event", {ems_c_attr_ulong_int,
    0} },
{(unsigned char*)"outcome", {ems_c_attr_ushort_
    int,0} },
{(unsigned char*)"authz_sty", {ems_c_attr_
    ushort_int,0} },
{(unsigned char*)"time", {ems_c_attr_utc,0} },
{(unsigned char*)"addr", {ems_c_attr_char_string,
    0} }
};
```

Event Filters

EMS supports the concept of two stage filtering. First stage filtering is applied on the machine that the supplier is running on to filter out events before they are even sent to EMS. Second stage filtering is applied by EMS to events received from suppliers. This stage controls which events get forwarded on to consumers.

The following sections describe the two stages of filtering EMS supports as well as how to define and organize the event filters.

First and Second Stage Filtering

In one embodiment, SVC and Audit event types are supported. The first stage filter for SVC events are the SVC routing destination SVC messages that are routed to EMS will be sent through the EMS event channel. For Audit, audit records that pass through the audit filter mechanism are sent through the EMS event channel.

The second stage filter is defined per EMS consumer. This stage associates an event filter group with each event consumer, and that consumer only receives events that pass through one of the entries in the consumer's event filter group.

Defining Event Filters

A typical scenario of how an event consumer would start interfacing with EMS would be for the consumer to first query EMS about what event types are supported. From that list of event types, the consumer could then query the event type schema, to construct any event filters for that event type. The event type schemas preferably contain the list of attribute names, and attribute types which the consumer would use to construct an event filter. The consumer would then tell EMS to apply the constructed event filter to incoming events by adding it to the consumer's event filter group EMS filters may be constructed at several different levels. The lowest level is the filter expression, which typically is a 3-tuple consisting of an attribute name, attribute operator, and an attribute value which defines a compare operation. All compare operations evaluate to a boolean value. Only certain attribute operators are allowed on certain attribute types.

The following are some examples of a filter expression;
ems_filter_exp_t_xmp_SVC, xmp_Audit;
xmp_SVC.attr_name="file";
xmp_SVC.attr_operator=ems_c_attr_op_eq;
xmp_SVC.attr_comp_value.type=ems_c_attr_char_
    string;
xmp_SVC.attr_comp_value.tagged_union.char_
    string="file.c";
xmp_Audit.attr_name="outcome";
xmp_Audit.attr_operator=ems_c_attr op eq;
xmp_Audit.attr_comp_value.type=ems_c_attr_
    ushort_int;
xmp_Audit.attr_comp_value.tagged_union.ushort_
    int=aud_c_esl_cond_denial;

The first example will evaluate to TRUE if the attribute name "file" of an SVC event type is equal to the string "file.c". In the second example, the filter expression xmp_Audit will evaluate to TRUE if the attribute name "outcome" of an Audit event type is equal to the attribute value aud_c_esl_cond_denial, which means that an Audit event Is recording that access was denied for some action.

An event filter typically is made up of a list of filter expressions that are added together. An event filter has both a name, and an event type. The event filter name is used to refer to the event filter in event filter create, delete and update operations. The event filter name is also used by consumers and EMS administrators to add event filters to an event filter group.

A consumer's event filter group preferably is a collection of one or more event filter names. For an event to pass through a consumer's filter group, the event filter associated with each event filter name specified in the event filter group is applied to the event. If all the event filter expressions in the named event filter evaluate to TRUE, then the event is forwarded by EMS to that consumer (because of the logical and operation. If any of the event filter expressions evaluate to FALSE, then the event filter specified by the next event filter name in the event filter group is applied to the event. If none of the event filters in the event filter group evaluate to TRUE, then the event is not forwarded to that consumer.

Filtering on Header Information or Event Type

A predefined set of event header attribute name/type pairs have been defined to allow filtering on the information in the event header. Filter expressions with event header attributes can be part of filters with event type specific header attributes. Filters with type Generic, however, can only have filter expressions with header attributes.

EMS Event Log

The EMS event log is used to store events in case of EMS failures. EMS writes all events to the event log, and delete the event record once the event has been transmitted to all consumers that are supposed to get the event.

The event log is kept in a file on the machine where emsd is running. Events are stored in a directory specified by the environment variable EMS_EVENTLOG_DIR. An API is provided to examine local event logs.

EMS Security Model

EMS provides for secure manipulation of data in the EMS databases. This includes the Event Filter Database, the Event Type Database as well as the list of consumers in the Consumer Database EMS also provides for supplier and consumer authentication and authorization as well as secure transmission of event data. All access control lists (ACL's) are associated with names in the DCE namespace, and the emsd server manages the namespace past the junction:

/.:/hosts<hostname>/ems-server/

The ACL associated with this object will control access to the emsd server registered in this namespace. The permissions associated with ems-server:

TABLE 1 emsd Server Permission Bits

| Permission bit | Name | Description |
| --- | --- | --- |
| c | control | Modify the ACLs on the server |
| r | read | Read the attributes for this server |
| s | stop | Stop the EMS server |
| w | write | Modify the attributes on this server |

Three security objects are maintained under the ems-server junction. The directories and the databases they represent are:

| | |
| --- | --- |
| event-types | Event type Database |
| filters | Filter Database |
| consumers | Consumer Database |

Each of these databases has an ACL associated with it.

Event Type Security Management

The Event Type database is represented by the following name in the DCE name space:

/.:/hosts/<hostname>/ems-server/event-types

The ACL associated with this object controls access to this database. The permissions associated with event-types are:

TABLE 2

Event Type Database Permission Bits

| Permission bit | Name | Description |
| --- | --- | --- |
| c | control | Modify the ACLs on the server |
| d | delete | Delete an event type schema |
| i | insert | Add an event type schema |
| r | read | Read the contents of event type schemas |

EMS event data access can be granted per event type. Authority on event data of a given event type can be granted by modifying the ACL on /.:/hosts/<hostname>/ems-server/event-types/<event_type_name> where <event_type_name> is the event type name which appears in the event type schema. The following names are recognized for SVC and Audit events are:

/.:/hosts/<hostname>/ems-server/events/SVC

/.:/hosts/<hostname>/ems-server/events/Audit

The permissions associated with <event_type_name> are:

TABLE 3

Event Type Permission bits

| Permission bit | name | Description |
| --- | --- | --- |
| c | control | Modify the ACLs on the event type |
| d | delete | Delete this event type |
| r | read | Read (Consume) an event of this type |

TABLE 3-continued

Event Type Permission bits

| Permission bit | name | Description |
| --- | --- | --- |
| w | write | Write (Supply) an event of this type |

A supplier's access rights may be verified on the first event send to EMS, and the consumer's access rights may be verified before forwarding events to that consumer. Authenticated RPC is used to access the EMS supplier and consumer Remote API.

Event Filter Security Management

The Filter Database is represented by the following name in the DCE name space:

/.:/hosts/<hostname>/ems-server/filters

The ACL associated with this object controls access to this database. The permissions associated with filters are:

TABLE 4

Filter Database Permission Bits

| Permission bit | Name | Description |
| --- | --- | --- |
| c | control | Modity the ACLs on filters |
| d | delete | Delete an event filter |
| i | insert | Add an event filter |
| r | read | Get a list of or the contents of event filters |

Event filter access control are granted per event filter. Authority on filter access for a given event filter is granted by modifying the ACL on /.:/hosts/<hostname>/ems-server/filters/<filter_name> where <filter_name> is the event filter name given the event filter on the call to ems_filter_add.

The permissions associated with event filters are:

TABLE 5

Event Filter Permission Bits

| Permission bit | Name | Description |
| --- | --- | --- |
| c | control | Modify the Acl on the event filter |
| d | delete | Delete the event filter |
| w | write | Modify the contents of an event filter |

When a consumer creates an event filter, that consumer principal automatically gets dwc permissions on the created event filter.

Consumer Security Management

The Consumer database is represented by the following name in the DCE name space:

/.:/hosts/<hostname>/ems-server/consumers

The ACL associated with this object controls access to this database. The permissions associated with consumers are:

TABLE 6

Consumer Database Permission Bits

| Permission bit | Name | Description |
|---|---|---|
| c | control | Modify the ACLs on consumers |
| d | delete | Delete a consumer |
| i | insert | Add (register) a consumer |
| r | read | List consumer information |
| w | write | Modify a consumer including his filter group |

EMS Security Initialization

When EMS is configured, several security groups are created by default. The groups are ems-admin, ems-consumer, and ems-supplier. The default permissions are:

/.:/hosts/<hostname>/ems-server object acl

| | |
|---|---|
| ems-admin | crws |
| hosts/<hostname>/self | rws |
| any_other | r |

/.:/hosts/<hostname>/ems-server/event-types object acl

| | |
|---|---|
| ems-admin | cri |
| ems-consumer | r |
| ems-supplier | ri |
| any_other | r | initial object acl (/.:/hosts/<hostname>/ems-server/event-types/<event_type_name>)

| | |
|---|---|
| ems-admin | cdw |
| ems-consumer | r |
| ems-supplier | w |

/.:/hosts/<hostname>/ems-server/filters object acl

| | |
|---|---|
| ems-admin | crdi |
| ems-consumer | ir |
| any_other | r | initial object acl (/.:/hosts/<hostname>ems-server/filters/<filter_name>)

| | |
|---|---|
| ems-admin | cw |

/.:/hosts/<hostname>/ems-server/consumers object acl

| | |
|---|---|
| ems-admin | cdrw |
| ems-consumer | irw |
| any_other | r |

By setting these permissions for the ems_admin group, each new event filter and event type created will automatically inherit the same permissions.

Administrators can add principals to each of these groups to give them access to all emd's running in a cell. If tighter security is desired, the group can be removed from the respective ACL, and principals can be added.

When transmitting events of type Audit, EMS preferably will use authenticated RPC set to DCE Security Protection Level strong integrity (rpc_c_protect_level_pkt_integrity).

Writing Consumers

Preferably, event consumers are not simple clients but rather are are implemented as servers. This is not required, however. Each EMS consumer_will likely have certain requirements: calling consumer start, registering an event handler, registering with the various emsd's that the consumer desires to receive events from, setting-up event filters, and calling rpc_server_listen.

The call to consumer_start creates the consumer uuid, and then registers the EMS Transmit to Consumer handler. The call to ems_consumer_handler_register, sets up an incoming consumer queue, and initializes the event handler function to call the handle function specified. One event consumer can register to receive events from multiple emsd servers on different hosts. Consumers must set up event filters before any events will be sent. Finally, it is up to the consumer to call rpc_server_listen to wait for incoming events.

EMS Recovery After Restart

EMS stores all state data in the following repositories

Consumer Database

Contains list of all suppliers, and all consumers as well as the list of filters in the consumer filter group.

Event Type Database

Contains the schemas for all the known event types.

Event Filter Database

Contains all the current filter definitions.

When an emsd is restarted, the following steps are performed:

1. All databases get restored
2. All consumers are told to reregister or reconnect
3. The event queue is restored from the event log files
4. event transmission proceeds

Event Queue

An event queue continues the following features;

Empty and full condition variables. These variables wait when until the queue is not Empty or not full respectively. They can be turned on and off if required.

Queue mutex. Used for pushing and popping elements onto the queue to provide multithreaded access to a queues Process element routine. This is a user written routine with a defined signature which is called to process queue elements. Each queue gets his own thread which calls this routines.

Maximum queue size. When the queue reaches this size, it waits on the full condition variable until not full.

Queue persistence. Each element on the queue is saved using DCE backing store so if the EMS goes down, the event queues can be restored.

Event Queue Elements

Event queue elements can contain two types of data.

A pointer to an Event

A pointer to another queue element

This allows EMS to have an active queue with elements pointing to events that have not been sent to all interested consumers, and consumer queues with elements that contain pointers to elements in the active queue. Each element also contains a mutex protected count of how many pointers to that element are active.

Data Structures

EMS Event Attributes

Event Attribute Types

The event attribute type is used to specify the data type of an event attribute. The attribute type specifies what format the data is in the event attribute value union (ems_attr_value_t).

All event attribute types are defined as typedef unsigned 16 ems_attr_type_t;

An event attribute type can be one of the following:

TABLE 7

Event Attribute Type Specifiers

| Attribute Type | Data Type | Size |
|---|---|---|
| ems_c_attr_small_int | idl_small_int | 1 byte |
| ems_c_attr_short_int | idl_short_int | 2 bytes |
| ems_c_attr_long_int | idl_long_int | 4 bytes |
| ems_c_attr_hyper_int | idl_hyper_int | 8 bytes |
| ems_c_attr_usmall_int | idl_usmall_int | 1 byte |
| ems_c_attr_ushort_int | idl_ushort_int | 2 bytes |
| ems_c_ulong_int | idl_ulong_int | 4 bytes |
| ems_c_attr_uhyper_int | idl_uhyper_int | 8 bytes |
| ems_c_attr_short_float | idl_short_float | 4 bytes |
| ems_c_attr_long_float | idl_long_float | 8 bytes |
| ems_c_attr_boolean | idl_bootean | 1 byte |
| ems_c_attr_uuid | uuid_t | 16 bytes |
| ems_c_attr_utc | utc_t | 16 bytes |
| ems_c_attr_severity | ems_severity_t | 4 bytes |
| ems_c_attr_acl | sec_acl_t* | variable size |
| ems_c_attr_byte_string | idl_byte* | variable size |
| ems_c_attr_char_string | idl_char* | variable size |
| ems_c_attr_bytes | see Structure | variable size |

Byte strings and character strings are terminated with a 0 (zero) byte. The pickling service of the IDL compiler can be used to encode complex data types into byte strings that are to be included in an EMS event.

Event Attribute Values

The event attribute value union is a self defining data structure which has an attribute type specifier (type) which tells what type of data is in the union, and then appropriate union members to hold the value of the data specified.

```
typedef struct ems_bytes_s_t {
    unsigned32       size;      /* size of byte data      */
    [size_is(size)]
    byte *           data;      /* byte data              */
} ems_bytes_t;
typedef union switch (ems_attr_type_t format) {
    case ems_c_attr_small_int:
        small int small_int;
    case ems_c_attr_short_int:
        short int short_int;
    case ems_c_attr_long_int:
        long int long_int;
    case ems_c_attr_hyper_int:
        hyper int hyper_int;
    case ems_c_attr_usmall_int:
        unsigned small int usmall_int;
    case ems_c_attr_ushort_int:
        unsigned short int ushort_int;
    case ems_c_attr_ulong_int:
        unsigned long int ulong_int;
    case ems_c_attr_uhyper_int:
        unsigned hyper int uhyper_int;
    case ems_c_attr_short_float:
        float short_float;
    case ems_c_attr_long_float:
        double long_float;
    case ems_c_attr_boolean:
        boolean bool;
    case ems_c_attr_uuid:
        uuid_t uuid;
    case ems_c_attr_utc:
        utc_t utc;
    case ems_c_attr_acl:
        sec_acl_t * acl;
    case ems_c_attr_byte_string:
        [string] byte * byte_string;
    case ems_c_attr_char_string:
        [string] char * char_string;
    case ems_c_attr_bytes:
        ems_bytes_t * bytes;
    default:
        ;
} ems_attr_value_t;
```

Event Attribute

Event attributes typically contain an event attribute name/type pair which define an event attribute. Event attributes can be used in defining event types in event type schemas, and in defining event filters in event filter expressions. The attr_name specifies the attribute name, and the attr_type specifies the format of the attribute value.

```
typedef struct ems_attribute_s_t {
    ems_string         name;    /* event attribute name */
    ems_attr_value_t   value;   /* event attribute type */
} ems_attribute_t;
```

EMS Event Structure

Event Type

An event type specifies the unique id for a given event type.

```
typedef uuid_t ems_event_type_t;
```

TABLE 8

Default Event Types

| Event Type | Event Type Name |
|---|---|
| ems_c_generic_type | Generic |
| ems_c_svc_type | SVC |
| ems_c_aud_type | Audit |

Events of type Generic, do not have event type schema's associated with them, and can only be filtered by expressions with header attributes in them.

Event Identifier

An event identifier uniquely identifies a given event. Each event normally has both an event type which is unique to all events of this type, and an event id which is unique to a specific event.

```
typedef struct ems_eventid_s_t {
    ems_event_type_t   type;   /* event type            */
    uuid_t             id;     /* Unique event Identifier */
} ems_eventid_t;
```

Network Name

A network name identifies the network name of a given host machine. The name service specifies which name service recognizes the given network name.

```
typedef enum ems_nameservice_s_t {
    ems_ns_other = 0,   /* name service other than listed */
    ems_ns_dns,         /* DNS name service               */
    ems_ns_dce,         /* DCE CDS name Service           */
    ems_ns_x500,        /* X500                           */
    ems_ns_nis,         /* NIS                            */
    ems_ns_sna          /* SNA network                    */
} ems_nameservice_t;
```

The ems_netaddr_t structure specifies the actual network name. It can be interpreted according to the name service specified.

```
typedef char ems_octet_t;   /* used for NLS support */
typedef struct ems_netaddr_s_t {
    unsigned short      len;
    [size_is(len)]
    ems_octet_t         name[ ];   /* name in appropriate format */
} ems_netaddr_t;
typedef struct ems_netname_s_t {
    ems_nameservice_t   service;   /* name service used for netname */
    [ptr] ems_netaddr_t *  netaddr;  /* network name/address */
} ems_netname_t;
```

For a DCE hostname, the following example will set the ems_netname_t structure;

```
static char * dce_hostname="/.:/
    Ihostsfeagle.austin.ibm.com";
ems_netname_t netname;
netname.service=ems_ns_dce;
netname.netaddr→len=strien(dce_hostname)+1;
netname.netaddr→name=(char *)malloc
    (netname.netaddr→len);
strcpy(netname.netaddr→name, dce_hostname);
```

Event Origin

The event origin specifies where the event originated (i.e. the supplier). The origin specifies the netname of the host where the supplier is running, the name of the supplier, descname, and supplier process identification (pid, uid, gid). These values may not be valid for all hosts.

```
typedef struct ems_origin_s_t {
    ems_netname_t   netname;    /* network name of originator host */
    [string] char * descname;   /* descriptive name of the supplier */
    unsigned32      pid;        /* the process id of originator    */
    unsigned32      uid;        /* the user id of originator       */
    unsigned32      gid;        /* the group id of originator      */
} ems_origin_t;
```

Event Severity

The event severity specifies the severity of the event. The names have a one-to-one correspondence to DCE SVC severity attribute values:

```
typedef enum ems_severity_e_t {
    ems_sev_info = 0,          /* Information event    */
    ems_sev_fatal,             /* Fatal event          */
    ems_sev_error,             /* Alert event          */
    ems_sev_warning,           /* Warning event        */
    ems_sev_notice,            /* Notice event         */
    ems_sev_notice_verbose,    /* Notice Verbose event */
    ems_sev_debug              /* Debug event          */
} ems_severity_t
```

Event Header

The event header describes the fixed part of the event data structure. The header contains the eventid, the origin of the event, the severity along with the time the event was both received at EMS, and delivered to the consumer.

```
typedef struct ems_hdr_s_t {
    ems_eventid_t    eventid;    /* event identifier          */
    ems_origin_t     origin;     /* event Origin              */
    ems_severity_t   severity;   /* event Severity            */
    utc_t            received;   /* event received timestamp  */
    utc_t            delivered;  /* event delivered timestamp */
} ems_hdr_t;
```

A set of Filter attributes are provided for event header filtering. The following names can be used for the filter attribute in an event filter expressions.

TABLE 9

Event Header Attributes

| Attribute Name | Attribute Type |
|---|---|
| eventid.id | ems_c_attr_uuid |
| eventid.type | ems_c_attr_uuid |
| origin.netname.service | ems_c_attr_ulong |

TABLE 9-continued

Event Header Attributes

| Attribute Name | Attribute Type |
| --- | --- |
| origin.netname.netaddr | emc_c_attr_bytes |
| origin.descname | ems_c_attr_char_string |
| origin.pid | ems_c_attr_ulong |
| origin.uid | ems_c_attr_ulong |
| origin.gid | ems_c_attr_ulong |
| severity | ems_c_attr_ulong |
| received | ems_c_attr_utc |

Event

The ems_event_t structure contains a fixed part, the event header, and a variable part, the event data items Each data item is a self-defining value which contains an attribute type, and attribute date. A count specifies how many data items are in the event.

```
typedef struct ems_event_s_t {
ems_hdr_t         header;   /* fixed event header   */
unsigned32        count;    /* number of data items */
[size_is(count)]
ems_attribute_t   item[ ];  /* data items           */
} ems_event_t;
```

EMS Event Types

The EMS Event Type structures are used to define the EMS Event types.

Event Type Schema

The event type schema is used to define an event type. It consists of an event type id, type, a name field which specifies the name of the event type, and a list of event type attributes describing the format of this event type. Size specifies the number of attributes in an event type. The event type schemas only specifies the fixed part of an event. An event can have as many unnamed attributes following the list of attributes specified here.

```
typedef struct ems_event_type_schema_s_t {
ems_event_type_t      type;        /* EMS event type        */
[string] char*        name;        /* event type name       */
long                  size;        /* number of attributes  */
[size_is(size)]
ems_attribute_t       attribute[]; /* event type attributes */
} ems_event_type_schema_t;
```

Event Type List

The event type list contains a list of size event type schemes.

```
typedef [ptr] ems_event_schema_t * ems_schema_ptr_t;
  typedef struct ems_event_type_list_s_t {
  long            size:       /* number of event type schema*/
  [size_is(size)]
  ems_schema_ptr_t    schema[]: /* ptr To event type schemas
  */
  } ems_event_type_list_t;
```

EMS Event Filters

The event filter data structures allow the definition of both event filters, and event filter lists.

Attribute Operators

TABLE 10

Attribute Operators

| Attribute Operator | Description of Attribute Operator |
| --- | --- |
| ems_c_attr_op_eq | TRUE if attr_name equal (= =) to attr_value |
| ems_c_attr_op_gt | TRUE if attr_name greater than (>) attr_value |
| ems_c_attr_op_lt | TRUE if attr_name less than (<) attr_value |
| ems_c_attr_op_ge | TRUE if attr_name greater than or equal (> =) to attr_value |
| ems_c_attr_op_le | TRUE if attr_name greater than or equal (< =) to attr_value |
| ems_c_attr_op_ne | TRUE if attr_name not equal (< >) to attr_value |
| ems_c_attr_op_bitand | TRUE if attr_name bitwise anded with attr_value is greater than 0 |
| ems_c_attr_op_substr | TRUE if attr_name contains the string value specified by attr_value |

Attribute operators define the boolean operation to perform on the attribute name, and the attribute value in the event filter expression. The attribute operator type is defined as:

typedef unsigned 16 ems_attr_op_t;

Event Filter Expression

The event filter expression structure contains the elements of an event filter expression that is used to build an event filter. Event filter expressions contain an attribute name, operator, value triplet (attr_name, attr_operator, attr_value) which defines a boolean filter expression.

```
typedef struct ems_filter_exp_s_t {
[string] char *       attr_name;     /* attribute Name     */
ems_attr_op_t         attr_operator; /* attribute operator */
ems_attr_value_t      attr_value     /* attribute value    */
} ems_filter_exp_t;
```

Event Filter Expression List

An event filter expression list groups a list of filter expressions together in a list to form an ANDed filter expression used in defining an event filter.

```
typedef struct ems_filter_exp_list_s_t {
long                  size;          /* number of filter expressions
*/
```

```
[size_is(size)]
ems_filter_exp_t    filter_exps[];   /* filter expressions in list */
} ems_filter_exp_list_t;
```

Event Filter

An event filter specifies a series of event filter expressions that will be ANDed together to perform a filter operation. The event filter contains a name (filter_name), which will be entered in the CDS name space, and a list of filter expressions (event_exp_fist).

```
typedef struct ems_filter_s_t {
ems_string_t          filter_name;      /* event filter name      */
ems_event_type_t      type,             /* type of event filter   */
ems_filter_exp_list_t filter_exp_list;  /* list of filter
expressions                 */
} ems_filter_t;
```

Filters with event type of generic, can only have filter expressions with header attribute names in them.

Event Filter Name List

An event filter list contains a list of size event_filter_names;

```
typedef [string] char * ems_string_t;
typedef struct ems_filtername_list_s_t {
long              size;       /* number of event filter names*/
[size_is(size)]               /* event filter names in group   */
ems_string_t      filter_names[];
} ems_filtername_list_t;
```

Event Filter List

The event filter list structure contains a list of size filters

```
typedef struct ems_filter_list_s_t {
long              size;       /* number of event filters */
[size_is(size)]
ems_filter_t *    filters[];  /* event filter list       */
} ems_filter_list_t;
```

EMS Consumer Data Structures

Consumer

The consumer data structure defines an EMS consumer. Each consumer has a name, which is entered in CDS, a hostname where the consumer is running, and a uuid unique to that consumer.

```
typedef struct ems_consumer_s_t {
[string ] char *  name;      /* DCE name of consumer     */
ems_netname_t *   hostname;  /* DCE hostname of consumer */
uuid_t            uuid;      /* DCE consumers uuid       */
} ems_consumer_t;
```

Consumer List

The consumer list structure contains a list of size consumer entries.

```
typedef struct ems_consumer_list_s_t {
long              size;      /* number of consumer entries */
```

```
[size_is(size)]
ems_consumer_t    consumer[];  /* consumer info */
} ems_consumer_list_t;
```

EMS Server Data Structure

Attribute List

The attribute list data structure defines a list of server attributes. Each attribute is a value maintained by and emsd server, and the attribute list can be used to query and set those values.

```
typedef struct ems_attrlist_s_t {
long              size;      /* number of attributes   */
[size_is(size)]
ems_attribute_t   attr[];    /* event type attributes  */
} ems_attrlist_t;
```

Application Programming Interface (API)

The following are some representative routines of the EMS API, which implement the RPC interface:

Register with EMS

```
#include <dce/ems.h>
void ems_register(
    ems_netname_t *    hostname,   /* DCE host name */
    ems_handle_t *     handle,     /* ems handle    */
    error_status_t *   status);    /* mgmt request status */
```

DESCRIPTION:

This routine registers with EMS, and obtains an EMS binding handle. This routine can be used by a management application that will be using the EMS Management or by event suppliers that wish to add new event types.

Permission Required

None

PARAMETERS:

Input hostname: is the name of the DCE host machine where emsd is running. If the hostname is NULL, then the local host is assumed.

Output handle: returns an EMS handle to use for future calls to EMS routines.

status: returns the status code from this routine which indicates whether the routine completed successfully or, if not, why not.

The possible status codes and their meaning are as follows:

| | |
|---|---|
| error_status_ok | Success |
| ems_s_no_memory | An EMS handle cannot be allocated |
| ems_s_unsupported_nameservice | hostname contains an unsupported name service |

Remote Supplier Transmit void rsupplier_transmit(

| [in] | handle_t | handle, |
| [in] | ems_event_t * | event, |
| [out] | error_status_t * | status); |

DESCRIPTION:

Transmit an event to EMS.

Permission Required

| (w) | on | /.:/hosts/<hostname>/ems-server/event-types/<type_name> |

PARAMETERS:

| | Input | |
| | handle | EMS binding handle |
| | event | transmitted event |
| | Output | | status Returns the status code from this routine which indicates whether the routine completed successfully or, if not, why not. The possible status codes and their meaning are as follows:

| error_status_ok | Success |
| ems_s_no_memory | EMS server received an error allocating memory |

Remote Consumer Add Event Filters to a Group void rconsumer_add_filter_to_group(

| [in] | handle_t | handle, |
| [in] | cons_context_t | ch, |
| [in] | ems_filtername_list_t * | filter_list, |
| [out] | error_status_t * | status); |

DESCRIPTION:

Add the event filters names in filter_list to a consumers event filter group. The consumer is identified by it's uuid.

Permission Required (w) on /.:/hosts/<hostname>/ems-server/consumers

PARAMETERS:

| Input | | |
| handle | EMS binding handle | |
| ch | Consumer context handle returned by rconsumer_register. | |
| filter_list | List of event filter names | |
| Output | | | status Returns the status code from this routine which indicates whether the routine completed successfully or, if not, why not.

The possible status codes and their meaning are as follows:

| error_status_ok | Success |

EMS Transmit

| [in] | handle_t | handle, |
| [in] | ems_event_t * | event, |
| [out] | error_status_t * | status); |

DESCRIPTION:

Transmit an event from EMS to a consumer.

PARAMETERS:

| | Input | |
| | handle | Consumer binding handle |
| | event event | |
| | Output | | status Returns the status code from this routine which indicates whether the routine completed successfully or, if not, why not.

The possible status codes and their meaning are as follows:

| error_status_ok | Success |

One of the preferred implementations of the event management service of the invention is as a set of instructions in a code module resident in the random access memory of a computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Figure 8:
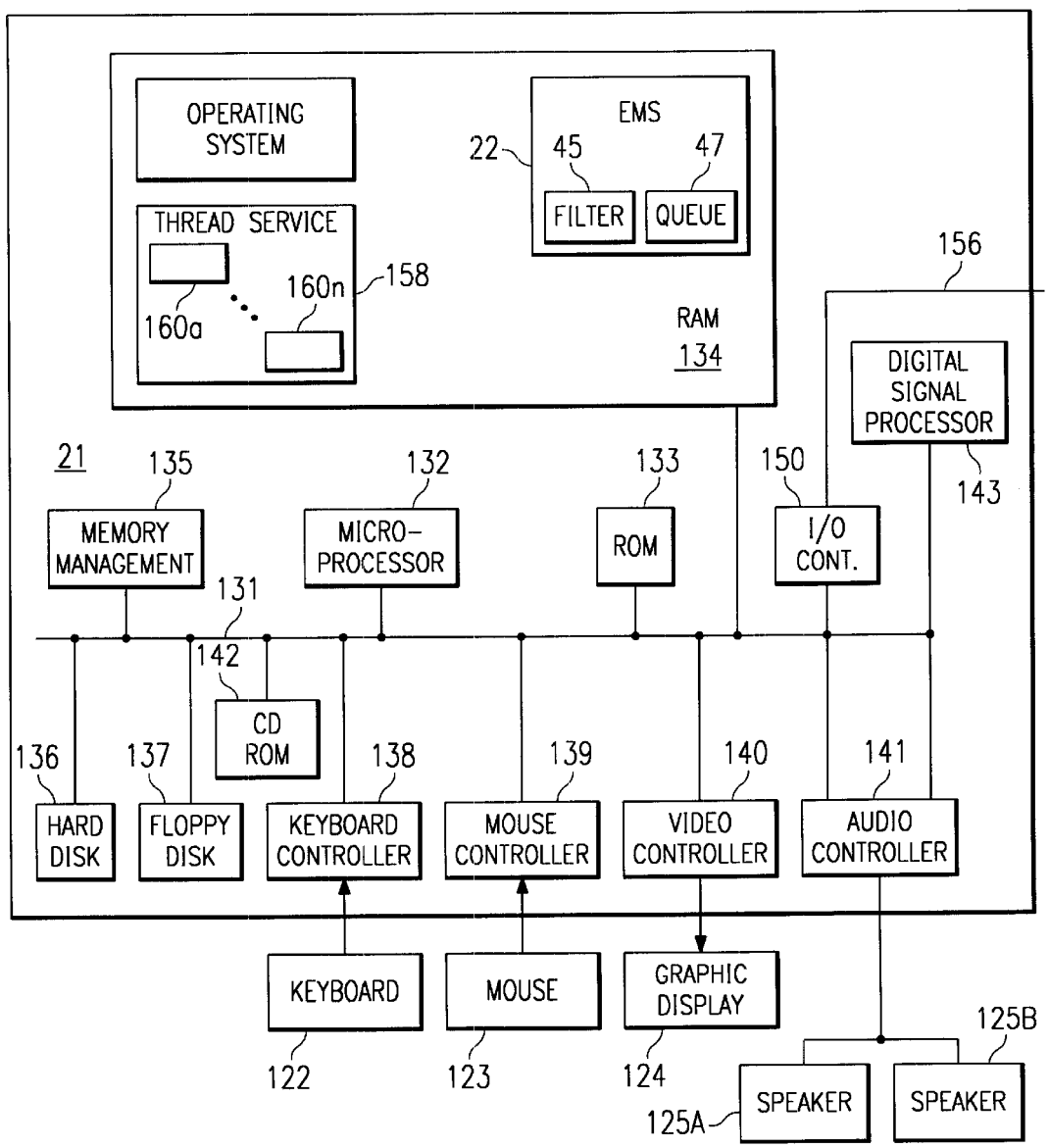
FIG. 8 is a block diagram of a computer system in which the event management service of this invention is implemented.

FIG. 8 shows a block diagram of a representative computer system in which the present invention is implemented. The system unit 21 includes a system bus or plurality of system buses 131 to which various components are coupled and by which communication between the various components is accomplished. The microprocessor 132 is connected to the system bus 131 and is supported by read only memory (ROM) 133 and random access memory (RAM) 134 also connected to system bus 131. he microprocessor may be of the Intel family of microprocessors, including the 386 or 486 microprocessors, or some other microprocessor such as one of Motorola's family of microprocessors (the 68000, 68020 or the 68030 microprocessors) or one of the RISC microprocessors manufactured by IBM, Hewlett Packard, Sun, Intel, Motorola and others, The ROM 133 contains among other code the Basic Input-Output system (BIOS) which controls basic hardware operations such as the interaction and the disk drives and the keyboard. The RAM 134 is the main memory into which the operating system and application programs are loaded. The memory management chip 135 is connected to the system bus 131 and controls direct memory access operations including, passing data between the RAM 134 and hard disk drive 136 and floppy disk drive 137. The CD ROM 142, also coupled to the system bus 131, is used to store a large amount of data, e.g., a multimedia program or large database.

Also connected to this system bus 131 are various I/O controllers; the keyboard controller 138, the mouse controller 139, the video controller 140, and the audio controller 141. The keyboard controller 138 provides the hardware interface for the keyboard 122, the mouse controller 139 provides the hardware interface for the mouse 123, the video controller 140 is the hardware interface for the display 124, and the audio controller 141 is the hardware interface for the speakers 125*a* and 125*b*. An I/O controller 150 such as a Token Ring Adapter enables communication over a network 156 to other similarly configured data processing systems.

As seen in FIG. 8, the RAM 134 supports the Event Management Service 22 including the filter mechanism and queue mechanism. The Threads Service is identified by reference numeral 168 and includes a plurality of thread process routines 160*a*–160*n*.

Although the invention has been described in terms of a preferred embodiment in a specific operating system and network environment (OSF DCE), those skilled in the art will recognize that the invention can be practiced, with modification, in other and different operating systems and network architectures within the spirit and scope of the appended claims. The invention is not to be construed as limited to the OSF DCE architecture and thus in a more general sense the invention should be broadly construed to cover any network environment, whether traditional or object-oriented.

Having thus described our invention, what we claim as new and desire to secure by Letters Patent is set forth in the following claims:

What is claimed is:

1. A method of managing events in a distributed computing environment wherein event suppliers generate events to be communicated to event consumers, comprising the steps of:

having each event consumer define an event filter group identifying one or more event filters at least one of which includes a plurality of event filter expressions, the event filter group including information determining whether particular events generated by the event suppliers are communicated to the event consumer;

for a given event, determining if all event filter expressions of any event filter of an event filter group evaluate to a predetermined condition; and communicating the given event to the event consumer if all event filter expressions of any event filter of the event filter group evaluate to the predetermined condition.

2. The method of managing events in a distributed computing environment as described in claim 1 wherein the event filter group includes one or more event filter names identifying the one or more event filters.

3. The method of managing events in a distributed computing environment as described in claim 1 wherein the determining step includes the steps of:

(a) determining whether all event filters in the event filter group have been evaluated;

(b) if all event filters in the event filter group have not been evaluated, selecting a next event filter for evaluation;

(c) determining whether all of the filter expressions in the next event filter evaluate to the predetermined condition;

(d) if all of the filter expressions in the next event filter evaluate to the predetermined condition, communicating the event to the event consumer;

(e) if any of the filter expressions in the event filter do not evaluate to the predetermined condition, returning to step (a).

4. The method of managing events in a distributed computing environment as described in claim 1 wherein the information is one or more event type schemas each describing an event type and comprising a list of attribute name/type pairs which specify a data format of an event.

5. The method of managing events in a distributed computing environment as described in claim 4 wherein an attribute name/type pair comprises an attribute name identifying an attribute of a given event type and an attribute type defining the data format in the attribute.

6. The method of managing events in a distributed computing environment as described in claim 5 wherein each filter expression of the event filter comprises an attribute name, an attribute operator and an attribute value, wherein the attribute operator compares the attribute named in the event and the attribute value.

7. The method of managing events in a distributed computing environment as described in claim 1 wherein the information is a header attribute associated with an event.

8. A computer network providing a distributed computing environment in which users can access distributed resources, comprising:

means for establishing an event channel through which events are passed from event suppliers to event consumers; and means for filtering the events generated by the event suppliers to determine which events are passed to the event consumers, wherein the filtering means comprises:

means for defining an event filter group for each event consumer, the event filter group identifying one or more event filters at least one of which includes a plurality of event filter expressions, the event filter group determining whether particular events generated by the event suppliers are communicated to the event consumer;

means responsive to a given event for determining if all event filter expressions of any event filter of an event filter group evaluate to a predetermined condition; and means responsive to the determining means for communicating the given event to the event consumer via the event channel if all event filter expressions of any event filter of the event filter group evaluate to the predetermined condition.

9. The computer network as described in claim 8 wherein the determining means performs a logic OR operation on the one or more event filters of the event filter group.

10. The computer network as described in claim 9 wherein the determining means performs a logic AND operation on the filter expressions of an event filter.

11. A computer system for use in a distributed computing environment, comprising:

a processor;

an operating system running on the processor;

event management service (EMS) program means run by the operating system for establishing an event channel through which events are passed from supplier processes to consumer processes; and means for filtering the events generated by the event suppliers to determine which events are passed to the event consumers, wherein the filtering means comprises:

means for defining an event filter group for each event consumer that determines whether particular events generated by the event suppliers are communicated to the event consumer, wherein the event filter group includes one or more event filters at least one of which includes a plurality of event filter expressions;

means responsive to a given event for determining if all event filter expressions of any event filter of an event filter group evaluate to a predetermined condition; and means responsive to the determining means for communicating the given event to the event consumer via the event channel if the event filter expressions of any event filter of the event filter group evaluate to the predetermined condition.

12. The computer system as described in claim 11 wherein the determining means performs a logic OR operation on the one or more event filters of the event filter group.

13. The computer network as described in claim 12 wherein the determining means performs a logic AND operation on the filter expressions of an event filter.

14. A computer program product in a computer-readable medium, comprising:

event management service (EMS) program means for establishing an event channel through which events are passed asynchronously from supplier processes to consumer processes; and means for filtering the events generated by the event suppliers to determine which events are passed to the event consumers, wherein the filtering means comprises:

means for defining an event filter group for each event consumer that determines whether particular events generated by the event suppliers are communicated to the event consumer, wherein the event filter group includes one or more event filters at least one of which includes a plurality of event filter expressions;

means responsive to a given event for determining if all event filter expressions of any event filter of an event filter group evaluate to a predetermined condition; and means responsive to the determining means for communicating the given event to the event consumer via the event channel if the event filter expressions of any event filter of the event filter group evaluate to the predetermined condition.

* * * * *